(12) United States Patent
Xu et al.

(10) Patent No.: US 7,340,140 B1
(45) Date of Patent: Mar. 4, 2008

(54) ER/YB DOUBLE CLAD PHOTONIC CRYSTAL FIBER

(75) Inventors: Yuanjian Xu, Thousand Oaks, CA (US); Francis S. Auricchio, Jr., Rolling Hills Estates, CA (US)

(73) Assignee: The Boeing Company, Chicago, IL (US)

( * ) Notice: Subject to any disclaimer, the term of this patent is extended or adjusted under 35 U.S.C. 154(b) by 21 days.

(21) Appl. No.: 11/298,737

(22) Filed: Dec. 9, 2005

Related U.S. Application Data (63) Continuation of application No. 11/146,958, filed on Jun. 7, 2005, now abandoned.

(51) Int. Cl.
G02B 6/02 (2006.01)
G02B 6/032 (2006.01)
G02B 6/036 (2006.01)

(52) U.S. Cl. ............... 385/125; 385/126; 385/127

(58) Field of Classification Search .......... 385/125, 385/126, 127
See application file for complete search history.

(56) References Cited

U.S. PATENT DOCUMENTS

2005/0105867 A1* 5/2005 Koch et al. ............ 385/125

OTHER PUBLICATIONS

T.A. Birks et al.; Full 2-D Photonic Bandgaps in Silica/Air Structures; Electronic Letters, vol. 31; Oct. 26, 1995; (pp. 1941-1943).

* cited by examiner

*Primary Examiner*—Michelle Connelly-Cushwa
(74) *Attorney, Agent, or Firm*—MacPherson Kwok Chen & Heid LLP; Greg J. Michelson (57) ABSTRACT

In accordance with at least one embodiment of the present invention, a photonic crystal fiber apparatus includes a first cladding layer and a second cladding layer. The first cladding layer includes a plurality of photonic crystal rods disposed in an array along a longitudinal axis. The array has a separation between a first portion of the rods that defines a core region. A second portion of the photonic crystal rods is doped with two rare earth elements. The first cladding layer is configured to propagate signal light. The second cladding layer provides physical support for the plurality of photonic crystal rods and is configured to propagate pump light.

46 Claims, 7 Drawing Sheets

ER/YB DOUBLE CLAD PHOTONIC CRYSTAL FIBER

CROSS-REFERENCE TO RELATED APPLICATIONS

This application is a continuation application of U.S. patent application Ser. No. 11/146,958, filed Jun. 7, 2005 now abandoned, which is herein incorporated by references for all purposes.

STATEMENT REGARDING FEDERALLY SPONSORED RESEARCH OR DEVELOPMENT

This invention was made with Government support under contract number FA8808-04-C-0022 awarded by the U.S. Air Force. The Government has certain rights in this invention.

TECHNICAL FIELD

The present invention relates generally to laser and optical amplifier systems, and more particularly to a photonic crystal fiber employing rare-earth doped fibers or waveguides having a greater efficiency through reduced amplified spontaneous emissions.

RELATED ART

Rare-earth doped fibers are an essential component of any optical communication system, and some solid state laser systems. Existing high power Erbium-Ytterbium (Er—Yb) optical fiber amplifiers and lasers suffer from low efficiency. One of the reasons for this low efficiency is due to the generation of Yb amplified spontaneous emission (ASE) in the fiber core with the traditional index guided double-clad structure in the Er—Yb double-clad fiber. In a traditional double clad Er—Yb-doped double clad fiber, such as that manufactured by Optical Fiber Solutions (OFS) of Norcross, Ga. 30071 USA, the fiber core is doped with both Er and Yb atoms, and the core confines optical modes for all wavelengths in the Er gain spectrum and the Yb gain spectrum. In such Er—Yb gain media, pump light propagates and is confined in a larger transverse area contained by an outer cladding layer.

Pump light from a laser source is absorbed in the core by Yb atoms and the absorbed energy is transferred to Er atoms in a thermal process. Signal or amplified spontaneous emission (ASE) is amplified through un-excited Yb atoms absorbing pump photons to their excited states, after which the excited Yb atoms then transfer the energy to Er atoms in ground states to their excited states. Both signal, Yb and Er ASE propagate in the fiber core since both excited Yb atoms and Er atoms exist in this gain medium. Stated differently, all signal or amplified spontaneous emission (ASE) in the gain bandwidth of Er or Yb will be amplified by the gain medium. Typically, signals in the Er gain bandwidth are desired to be amplified while anything in the Yb gain bandwidth, such as Yb ASE or lasing, is undesired to be amplified. The presence of Yb ASE or lasing action will lower the overall system efficiency. In addition, optical modes in the Yb gain spectrum may not be single mode, and are instead multi-mode in the transverse direction. Having more Yb optical modes means more power is wasted through Yb ASE or lasing.

Figure 1:
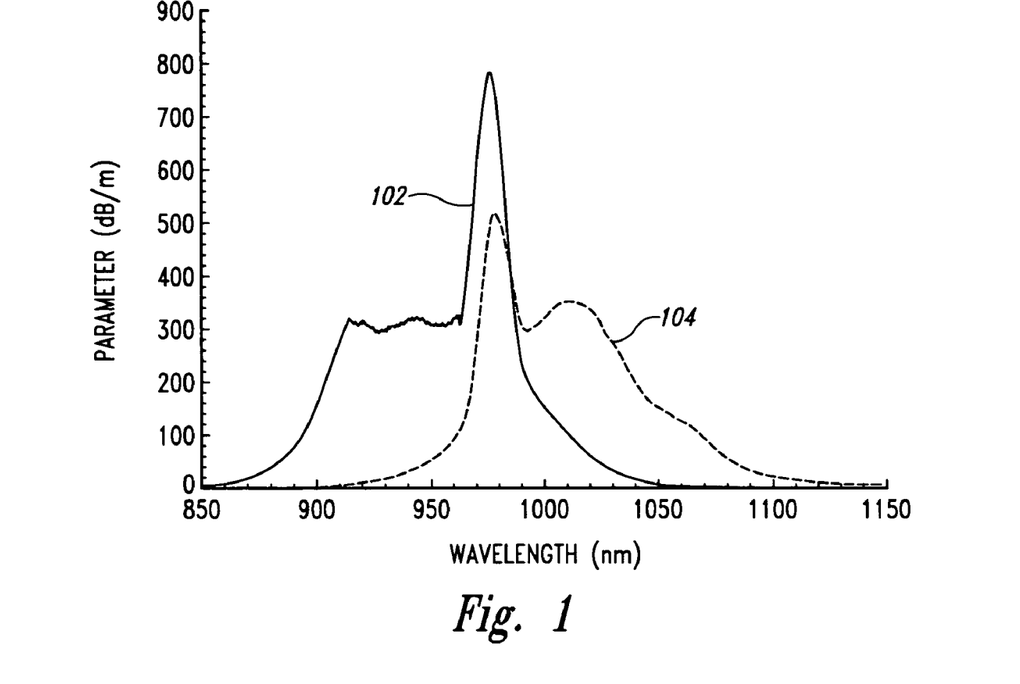
FIG. 1 shows the Yb absorption and gain spectrum for a traditional Optical Fiber Solutions (OFS) Er—Yb index guided double-clad fiber.
Figure 2:
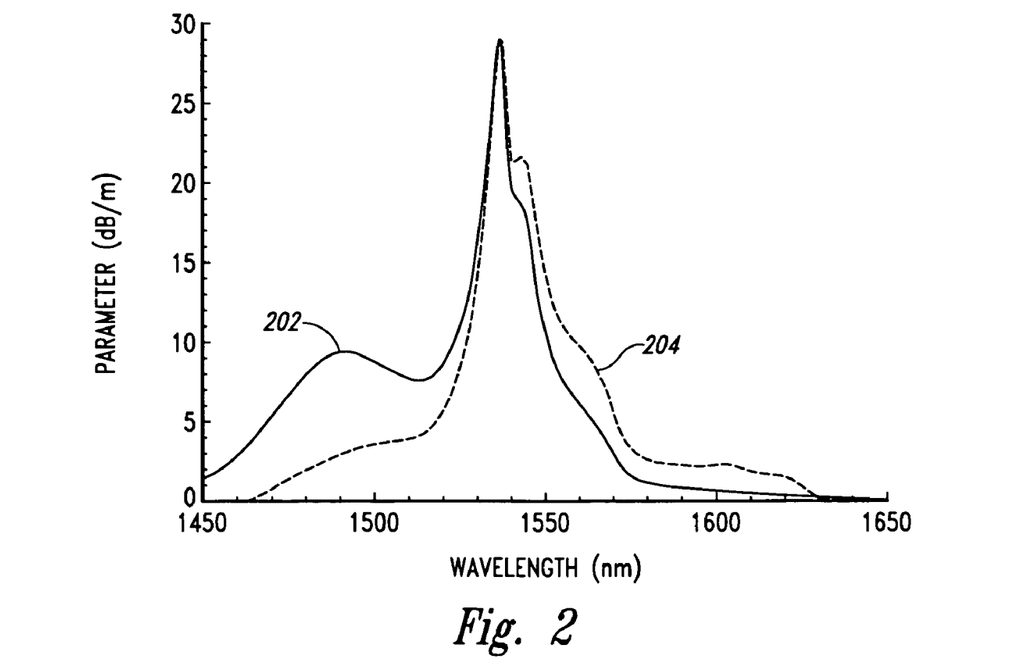
FIG. 2 shows the Er absorption and gain spectrum for the traditional OFS Er—Yb double-clad fiber.

FIG. 1 shows a traditional Yb absorption 102 and gain spectrum 104 for an OFS Er—Yb double-clad fiber. Similarly, FIG. 2 shows the Er absorption 202 and gain spectrum 204 for the OFS Er—Yb double-clad fiber. As shown, the traditional OFS fiber has an identifiable ASE spectrum in both the 1060 nm and 1550 nm regions because there are gains in these two regions. There is no significant ASE between 1150 nm to 1450 nm.

In the view of improving the overall energy conversion efficiency of Er—Yb amplification or lasing system, there remains a need for an apparatus, system, and method to promote propagation of optical signals within the gain bandwidth of Erbium (Er) while providing substantial reduction in the Ytterbium (Yb) amplified spontaneous emission (ASE).

SUMMARY

Apparatuses, systems, and methods are disclosed herein to provide substantial reduction in the Yb ASE in a photonic crystal fiber core yielding an improved light pump-to-signal efficiency. For example, in accordance with an embodiment of the present invention, a photonic crystal fiber includes a first cladding layer and a second cladding layer. The first cladding layer includes a plurality of photonic crystal rods disposed in an array along a longitudinal axis. The array has a separation between a first portion of the photonic crystal rods that defines a core region. A second portion of the photonic crystal rods is doped with two rare earth elements. The first cladding layer is configured to propagate signal light. The second cladding layer provides physical support for the plurality of photonic crystal rods and is configured to propagate pump light.

According to another embodiment, an optical system includes a light pump, an optical coupler, and a photonic crystal fiber that has a first end and a second end. The light pump provides a pump light beam. The optical coupler is configured to couple the pump light beam and a signal light beam into the photonic crystal fiber first end. The photonic crystal fiber second end emits an amplified signal light beam as an output beam.

According to yet another embodiment, a method of using a photonic crystal fiber includes the operations of coupling a combined signal light beam and a pump light beam to either a first end or a second end of a photonic crystal fiber, absorbing the pump light beam energy along the length of the photonic crystal fiber by a plurality of Yb atoms present within the photonic crystal fiber causing excitation of the Yb atoms, transferring the absorbed energy in the excited Yb atoms to Er atoms present within the photonic crystal fiber, confining an amplified spontaneous emission (ASE) falling within a gain bandwith of Yb to an outer cladding layer of the photonic crystal fiber, and confining the signal light and an Er ASE falling within a gain bandwith of Er to an inner cladding region of the photonic crystal fiber. The photonic crystal fiber has a core region where the inner cladding layer surrounds the core region and the outer cladding layer surrounds the inner cladding layer. The core region is doped with a ratio of erbium (Er) and ytterbium (Yb) atoms.

The present disclosure teaches structures and methods that fulfill long felt needs in the industry by reducing the Yb ASE in a photonic crystal fiber. In particular, the structures and methods disclosed have applications to diverse technology areas including terrestrial optical communications, high power optical amplifiers for satellite-to-satellite communications, and fiber laser applications.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

In the drawings, the dimensions of some objects, including the thickness of layers, regions, and the spacing between objects may be exaggerated for clarity, and are not to scale. Embodiments of the present invention and their advantages are best understood by referring to the detailed description that follows. It should be appreciated that like reference numerals are used to identify like elements illustrated in one or more of the figures.

DETAILED DESCRIPTION

This disclosure teaches a photonic crystal fiber and method of using that allows the amplification of signals in the fiber core falling within the Erbium (Er) gain bandwidth while confining the amplified spontaneous emission (ASE) in the Ytterbium (Yb) gain bandwidth to within a larger area defined by a fiber outer cladding that is outside of the fiber core. The disclosed photonic crystal fiber improves pump-to-signal efficiency because the shorter wavelength emission of Yb ASE is not confined in the fiber core and the effective gain for the Yb ASE is greatly reduced due to the much smaller overlap between the ASE transverse mode with the Yb doping region. Alternatively, the photonic crystal fiber may be referred to as a photonic bandgap fiber or waveguide.

A gain dilution factor for the Yb ASE, as compared with a traditional double clad fiber, is roughly the ratio of the fiber cladding area to the rare-earth doped area. In a traditional double-clad fiber, the Yb ASE mode is confined in the fiber core and the overlap ratio with that of the doped-ion is roughly unity. The overall Yb ASE power can be reduced due to the effective gain reduction for propagating the Yb ASE. The reduction of Yb ASE will also enhance the energy transfer rate from Yb ions to Er ions. One advantage of this structure is that the Yb ASE is significant suppressed because the Yb ASE encounters a significantly lower effective gain, making the overall system efficiency higher. Another advantage is that Yb lasing in the fiber core is suppressed because the gain in the Yb spectrum of the fiber core, also denoted a waveguide core, is significantly reduced when the feedback in the Yb gain spectrum is insufficient. Yet another advantage is that an amplifier or laser system utilizing the disclosed photonic crystal fiber will have better reliability because of the elimination of lasing in the Yb spectrum. Still another advantage is that it is not necessary for a high power optical amplifier system utilizing the disclosed crystal fiber to be shut off when there is no input signal, which reduces the amplifier system design and implementation complexity.

The light guiding properties of photonic bandgap or crystal fibers disclosed utilize the existence of photonic bandgaps due to the periodic microstructure that is distributed in the inner cladding region of the fiber. In general terms, photonic bandgaps represent some spectra which cannot propagate through the periodic structure. The fiber core is formed by introducing a local defect that breaks the periodicity of the photonic lattice geometry. It requires that the fiber core region has a relative lower refractive index than the cladding structure.

Figure 3:
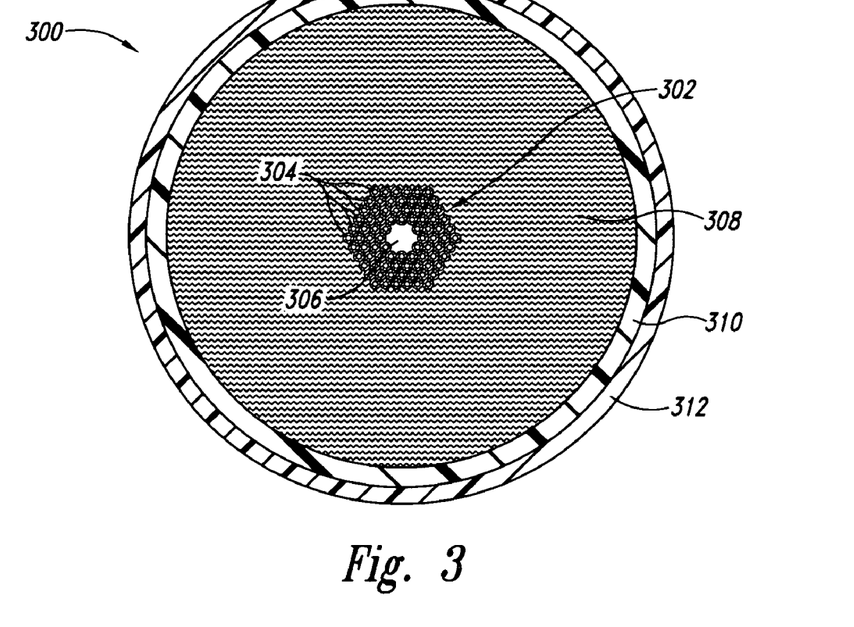
FIG. 3 shows a cross-sectional view of a photonic crystal fiber in accordance with an embodiment of the present invention.

In reference to FIG. 3, an embodiment of a photonic crystal fiber includes a photonic crystal array 302 including a plurality of photonic crystal rods 304 arranged in hexagonal array about a hollow core 306, a second cladding layer 308 and a low refractive index coating layer 310 to guide pump light within 308 (that is, pump light exists in 306, 302,308), and a protection layer 312. In this embodiment, hollow core 306 is not rounded. Outer cladding layer 308 can include, but is not limited to, a solid glass or silica material. Low index layer 310 includes a relative low refractive index material such as polymer surrounding cladding layer 308 which guides the propagation of pump light from pump lasers. Alternatively, the low index layer 310 can include a low refractive index polymer that can be used as both a protective coating and pump light confining material, that is, there is no 312 layer. The index contrast between cladding 308 and 310 is maximized to increase the numerical aperture for pump light. Cladding 308 has a round cross-section and can also be in other shape. The lateral structure, or cross-sectional profile, is essentially uniform along the light propagating direction of the photonic crystal fiber. Protective layer 312 can include an acrylate resin for covering the outside of layer 310.

Figure 4:
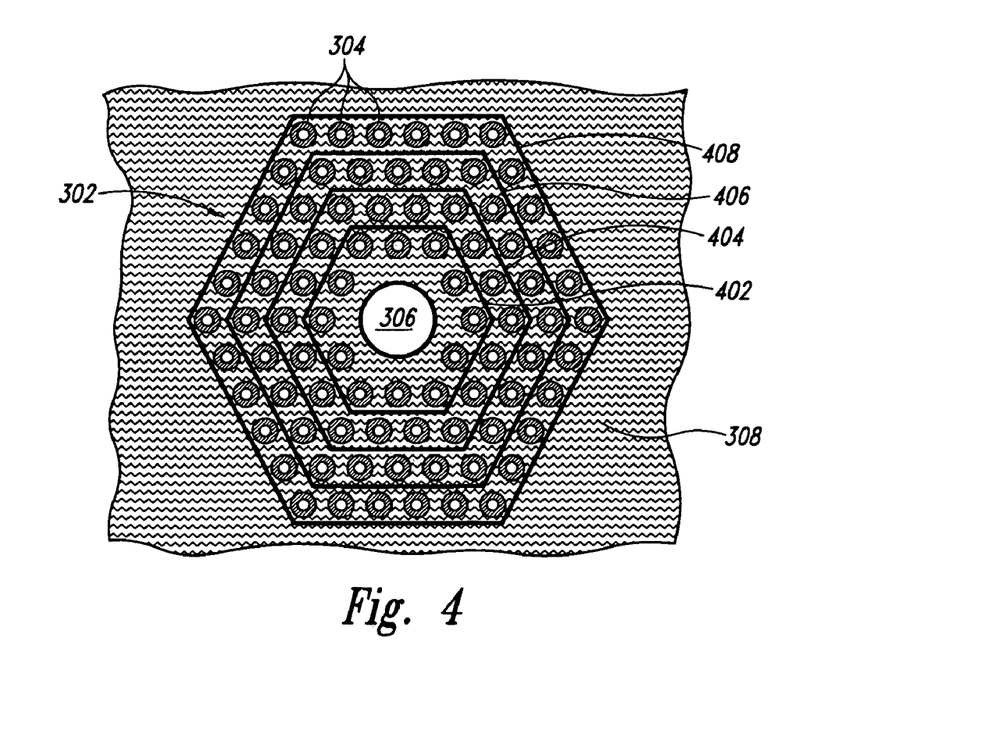
FIG. 4 shows a cross-sectional view of a photonic crystal region and the fiber core region in accordance with an embodiment of the present invention.

FIG. 4 shows a close-up view of array 302 and the plurality of photonic crystal rods 304. In the particular embodiment shown in FIG. 4, array 302 includes 54-instances of rods 304 surrounding fiber core 306 and configured into four rows or rings (402, 404, 406, and 408), but these parameters are not considered limiting. Preferably, a minimum number of three rings are included in the radial direction. Array 302 is constructed so that rods 304 are arranged in a triangular lattice of equal sides and the core 306 is made by omitting some of the rods in the center region of the fiber so that desired wavelength light within core 306 cannot proceed radially outwards from core 306 through inner cladding layer 302 and towards outer cladding layer 308. The single optical mode will overlap with the array 302 inner side at least one ring around 306. The longitudinal structure of array 302 is uniform along the light propagation direction of the fiber. The photonic crystal structure of array 302 around fiber core 306 is operative to confine the optical mode in the Er gain spectrum.

The dimensions of core 306 are optimized so that the optical mode has certain overlap with the Er—Yb doped region, and the background light propagation loss is within desired range by varying the ratio of the rod air hole radius to the rod lattice periodicity and the core area size, and Yb ASE is not confined in the core 306 and cladding 302. The number of concentric rows of rods 304 surrounding core 306 is selected to reduce signal background propagation loss in the core and to optimize the overlap between optical mode in Er gain spectrum and the doped rods. In one view, array 302 may be considered as a number of stacked, hollow rods configured into triangular shapes having equal sides. Alternatively, array 302 may be considered as arranged into a geometrical arrangement or configuration having a plurality of concentric rings (402, 404, 406, 408). In this embodiment, the geometrical arrangement has a hexagonal cross section. In one view, the region of fiber core 306 corresponds to an area where a predetermined number of rods are missing or removed from array 302. Beginning from a central hexagonal ring 402 surrounding core 306, at least the first layer of rods 304 comprising the first ring 402 surrounding core 306 are doped with Er and Yb ions in a predetermined ratio.

The Er and Yb doping concentration ratio is optimized for efficient energy transfer from Yb atoms to Er atoms with the doping density ratio of Yb to Er of at least 8:1. The maximum doping concentration is limited by Er ion pairing. It is preferred that Er—Yb ions are doped only in the inner rods around the core, the refractive index of the remainder of the rods in the photonic structure can be matched to the index of Er and Yb doped rods. The refractive index matching can be accomplished by varying other index raising or lowering doping material concentration in the rods such as Germanium, Aluminum, Phosphorus, Boron, etc. In contrast to tradition double-clad fiber where the outer cladding is typically not round, the outer cladding of the photonic crystal fiber can be many shapes, for example, round, "D"-shaped, rectangular, etc. Since there is a photonic crystal structure in the region surrounding fiber core 306, the pump light can be absorbed without many bounces in the outer clad.

Figure 5:
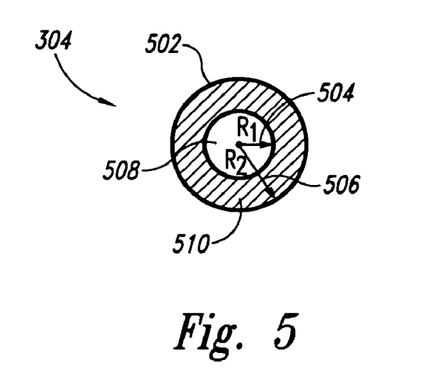
FIG. 5 shows a cross-sectional view of a photonic crystal rod having a round outer perimeter in accordance with an embodiment of the present invention.

FIG. 5 shows a detail of a first embodiment of a photonic crystal rod 304 where the outer perimeter 502 is round. The dimensions of this first embodiment are specified by an inside rod hole radius 504 and an outside rod body radius 506. The ratio of the rod hole radius 504 to the rod lattice constant ($2R_2$) is so chosen that the desired optical mode is confined in the core hole, not in the surface of the core, and is typically around 0.45. In this embodiment, rod 304 has a round hollow rod core 508 with the photonic rod material 510 formed as a circular cross-sectional tube surrounding round hollow rod core 508. Hollow rod core 508 may be filled with air, or other type of gas. Alternatively, hollow rod core 508 may be evacuated (vacuum). Inside rod hole radius 504 and outside rod body radius 506 are optimized so that the photonic bandgap covers at least some portion or all of the Er gain spectrum.

Figure 6:
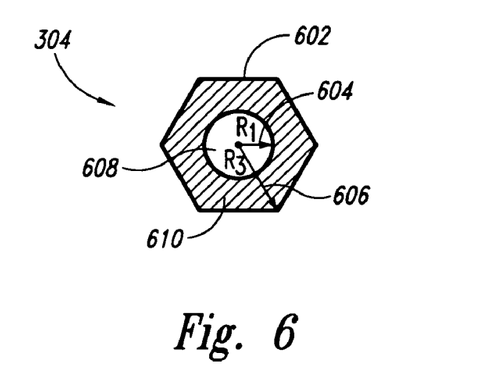
FIG. 6 shows a cross-sectional view of a photonic crystal rod having a hexagonal outer perimeter in accordance with an embodiment of the present invention.

FIG. 6 shows a detail of a second embodiment of a photonic crystal rod 304 where the outer perimeter 602 is hexagonal. The dimensions of this second embodiment are specified by an inside rod hole radius 604 and an outside rod body radius 606. In this embodiment, rod 304 has a round hollow rod core 608 with the photonic rod material 610 formed as a hexagonal cross-sectional tube surrounding round hollow rod core 608. Similar to the embodiment of FIG. 5, hollow rod core 608 may be vacuum, or filled with air or other type of gas. The hollow photonic crystal rods 304 described in reference to FIGS. 5 and 6 may have an outer perimeter that is round, hexagonal, or any other easily manufactured shape.

Figure 7:
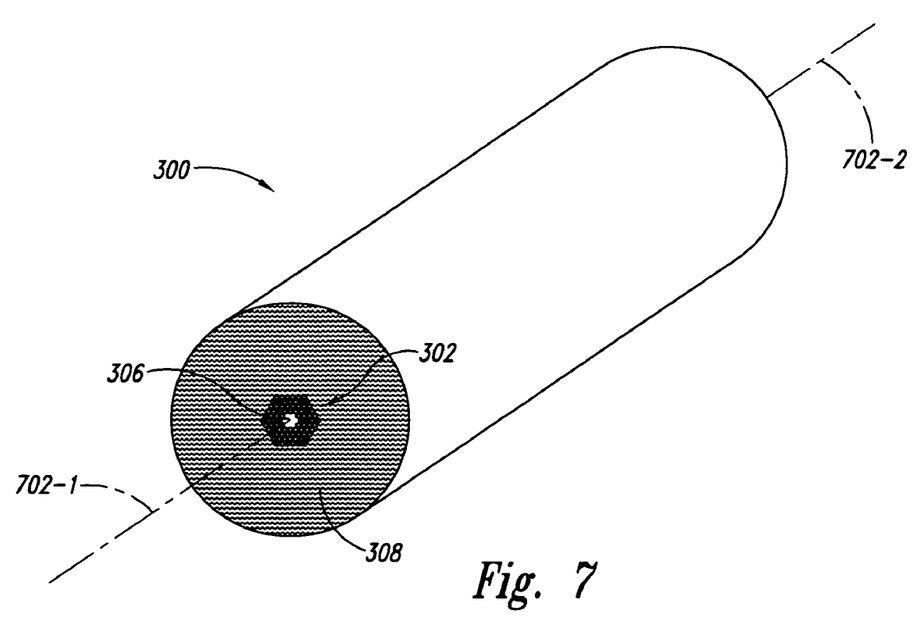
FIG. 7 shows a perspective view of a photonic crystal fiber in accordance with an embodiment of the present invention.

FIG. 7 shows a perspective partial view of the photonic crystal fiber 300 and a longitudinal axis 702 passing through the middle portion of fiber core 306. Array 302 is located symmetrically about core 306. Light from pump lasers is applied to the fiber cladding layer 308 along longitudinal axis 702, while the signal light propagates in 306 along longitudinal axis 702. The signal light can be lasing light in the Er spectrum (for laser applications) or external signal coupled into the fiber core with wavelength in the Er gain spectrum (for optical amplifier applications).

Figure 8:
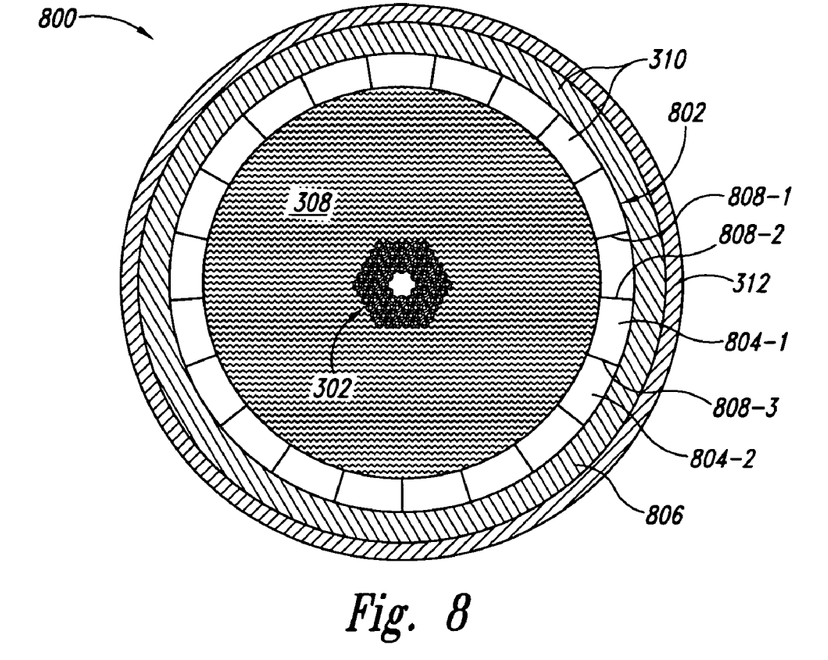
FIG. 8 shows a cross-sectional view of a photonic crystal fiber having an air-hole (perforated) ring interposed between a guiding layer, a supporting layer, and a protective layer in accordance with an embodiment of the present invention.

FIG. 8 shows a cross-sectional view of an embodiment of a photonic crystal fiber 800 having an air-hole (perforated) ring 802, to provide high refractive index contrast for pump light, interposed between cladding layer 308 and protective layer 312. Air hole ring 802 is defined by a plurality of hollow sections (804-1, 804-2) between cladding layer 308 and supporting layer 806 divided by a plurality of fin-like longitudinal interstitial members (808-1, 808-2, 808-3) that connect cladding layer and supporting layer while providing mechanical support for fiber 800. Alternatively, interstitial members 808 may be pin-like structures which do not have a substantial length dimension. The implementation of the photonic crystal fiber described above benefits from the high refractive index contrast between air and silica.

Figure 9:
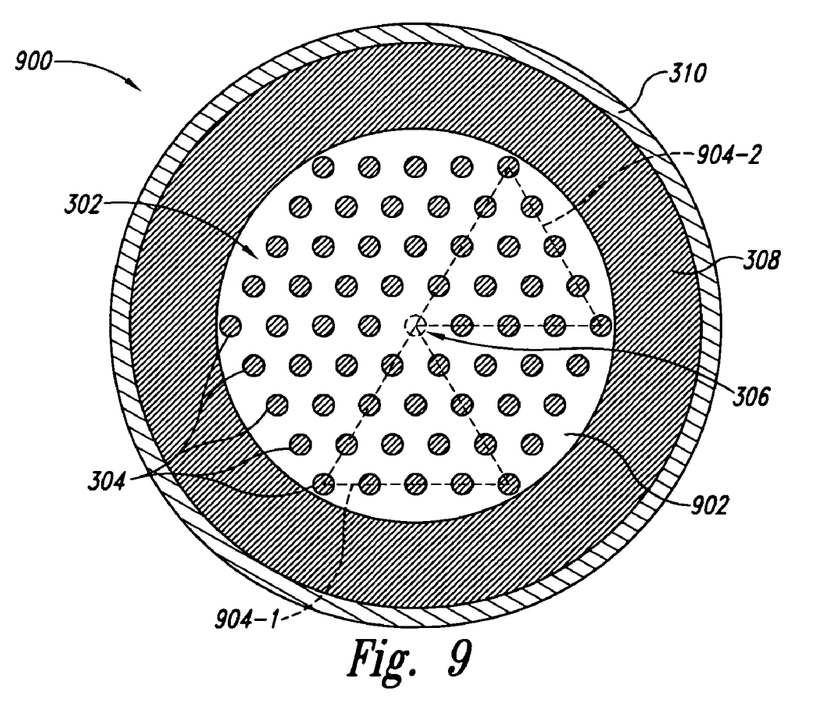
FIG. 9 shows a cross-sectional view of a photonic crystal fiber including a low index of refraction array background region surrounding and supporting an array of solid, high index of refraction rods, and a partially doped fiber core region, in accordance with an embodiment of the present invention.

FIG. 9 shows a cross-sectional view of a photonic crystal fiber 900 including a low index of refraction array background region 902 surrounding and supporting an array 302 of solid, high index of refraction rods 304, and a partially doped fiber core region 306. In this embodiment, including a smaller index contrast within the photonic crystal fiber 900, introducing an out-of-plane component of the signal light wave-vector into photonic crystal fiber 900 decreases the magnitude of the index contrast that is required to obtain a complete photonic bandgap. While the various embodiments described in reference to FIGS. 3-8 include a first type of photonic crystal rod 304 having a hollow core (508, 608), FIG. 9 teaches a second type of photonic crystal rod 304 having a solid core. In this case, photonic crystal fiber 900 comprises an inner cladding of array 302 including a plurality of solid, high-index rods 304 such as Ge-doped silica with a first index of refraction, a partially doped fiber core region 306 surrounded by array 302, an array background region 902 having a second index of refraction that is lower than the first index, an outer cladding layer 308 having a third index of refraction that is about equal to than the first index of rods 304, and a coating layer 310 having a fourth index of refraction that is lower than the third index. The index contrast between outer cladding layer 308 and coating layer 310 is maximized to obtain a large numerical aperture for pump light. The array 302 is placed for support into a substantially pure silica background material comprising array background region 902. As shown, array 302 includes a plurality of triangular lattice structures (904-1, 904-2). The plurality of rods 304 in each triangular lattice 904 are arranged so that signal light within core 306 cannot proceed radially outwards from the center of photonic crystal fiber 900 without colliding with at least one rod 304 in array 302. The materials of the rods 304 and the fiber core 306 and the rod background are so chosen to increase the index contrast. These materials can include base materials with different doping compositions. Examples of index raising dopants are germanium, aluminum, and phosphorus. Examples of index-lowering dopants are boron, and fluorine.

As described above, core region 306 can be formed by omitting one or more high-index rods 304 in array 302. Core region 306 is partially doped with Er—Yb ions. In this embodiment, rods 304 and outer cladding layer 308 include Ge-doped silica, core 306 includes an Er—Yb doped region surrounded by an array background region 902 composed of a substantially pure silica. In this manner, the effective refractive index of core 306 is lower than that of the Ge-doped silica rods 304. The resulting bandgap is designed so that the desired spectrum in the Er gain regime is confined in the core, not in the high-index rods of the inner cladding layer comprising array 302. In addition, the Yb ASE is confined in the outer cladding layer. In contrast to the previously discussed embodiments, fiber core 306 is doped in this embodiment, while doping is present in the rods around fiber core 306 for the other embodiments. The rest of the fiber implementation such as protective layer 310 is otherwise the same as in the other embodiments. Similar to the other described embodiments, the solid photonic crystal rods 304 of this embodiment may have an outer perimeter that is round, hexagonal, or any other easily manufactured shape.

Figure 10:
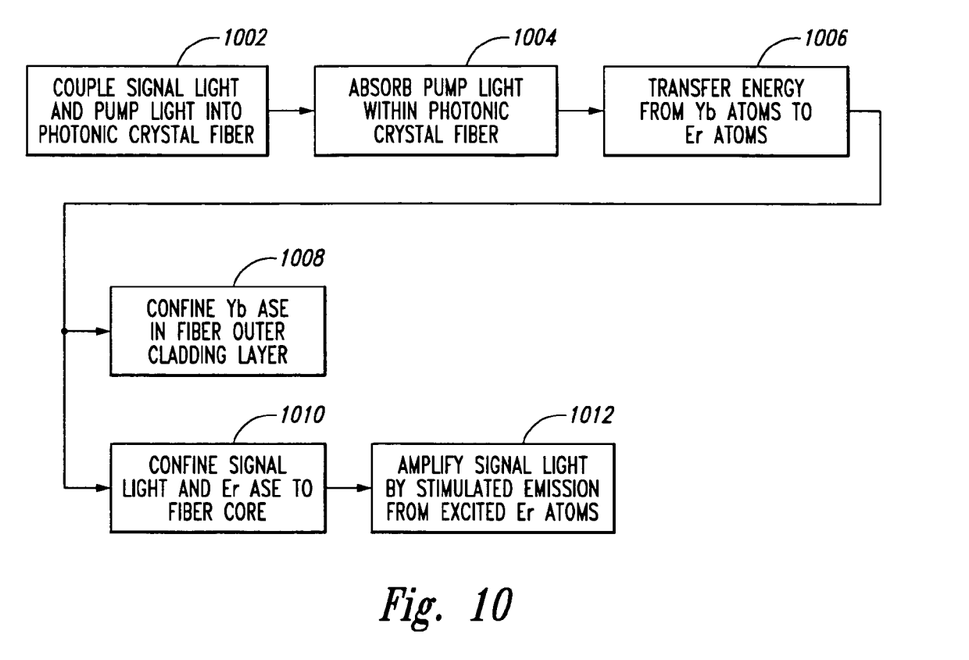
FIG. 10 shows a flow diagram describing a series of operations comprising an amplification flow using a photonic crystal fiber in accordance with an embodiment of the present invention.

FIG. 10 shows a flow diagram 1000 describing a series of operations comprising an amplification flow 1000 using a photonic crystal fiber 300. Specifically, in reference to FIGS. 3, and 10-11, flow 1000 includes a number of operations, including coupling 1002 a signal light beam 1104 and a pump light beam 1106-1 to a first end 1124 of a photonic crystal fiber 300. Signal light beam 1104 is applied to a first port 1118 of coupler 1102 while pump light beam 1106-1 is applied to a second port 1120 of coupler 1102. Signal light 1104 and pump light 1106-2 emerge from a third port 1122 of coupler 1102 and are applied to first end 1124 of photonic crystal fiber 300. Coupler 1102 has the property that the pump light 1106-1 may be received at a second port 1120 and emitted as pump light 1106-2 from third port 1122, but this pump light 1106-2 may not be directly emitted from first port 1118. In this embodiment, input light 1104 is received at first port 1118 and emitted from third port 1122 in a forward direction with pump light 1106-2. Alternatively, input light 1104 may be received at third port 1122 and emitted from first port 1118 in a reverse direction from pump light 1106-2.

Figure 11:
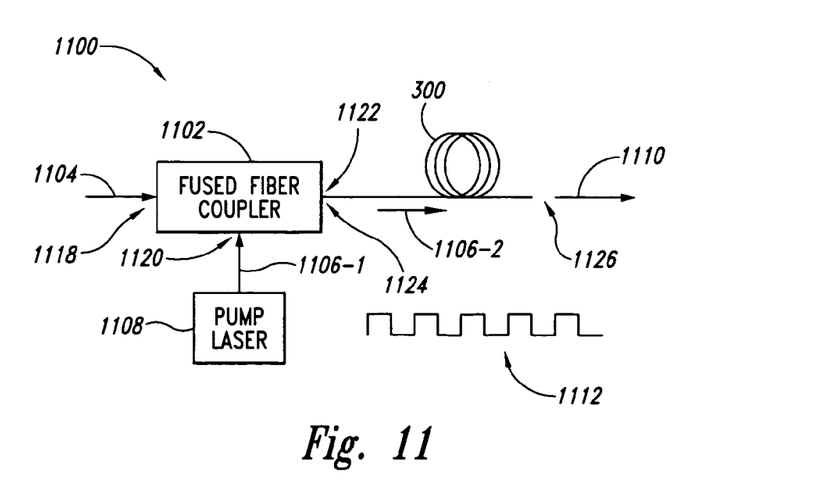
FIG. 11 shows a forward pumped optical amplifier system using a photonic crystal fiber in accordance with an embodiment of the present invention.

Flow 1000 continues with absorbing 1004 the pump light 1106-2 along the length of photonic fiber 300 by Yb atoms that are present within fiber 300, causing excitation of the Yb atoms. Flow 1000 continues with transferring 1006 the absorbed energy in the excited Yb atoms to Er atoms present within fiber 300. Since there are both excited Yb and Er atoms, and not all Yb atom energy is transferred, both Yb amplified spontaneous emission (ASE) and Er ASE exist within fiber 300. However, the amount of Yb ASE is significantly reduced n the present case when compared with a conventional index guided double clad fiber. Flow 1000 continues with confining 1008 the Yb ASE within outer cladding layer 308 while confining 1010 signal light 1104 and Er ASE to fiber core 306. Signal light 1104 falling within the Er gain spectrum range and Er ASE are contained in the fiber core 306. Finally, flow 1000 continues with amplifying 1012 the intensity of signal light 1104 traversing fiber 300 in order to produce amplified signal output beam 1110 through the process of stimulated emission from Er atoms within fiber 300. The amplified signal light 1104 is emitted from a second end 1126 of fiber 300 as output beam 1110. The above described operations (1004, 1006, 1008, 1010, and 1012) occur over the whole length of photonic crystal fiber 300.

FIG. 11 shows a forward pumped optical amplifier system 1100 using a photonic crystal fiber 300. System 1100 includes a fused fiber coupler 1102 to combine a single mode input signal 1104 and a multi-mode pump light 1106-1 from one or more pump lasers 1108, and photonic crystal fiber 300 to produce an amplified signal output beam 1110. Amplified signal output beam 1110 may be a carrier for a digitally encoded communications signal 1112 so that communications information may be transmitted along photonic crystal fiber 300. A person of ordinary skill in the relevant art will recognize there are many optical amplifier configurations that are within the scope of this disclosure. Fused fiber coupler 1102 can be replaced with bulk lens coupling optics. In this embodiment as well as others, optical isolators, tap couplers, power monitors, and driver electronics are not shown.

Figures 12, 13:
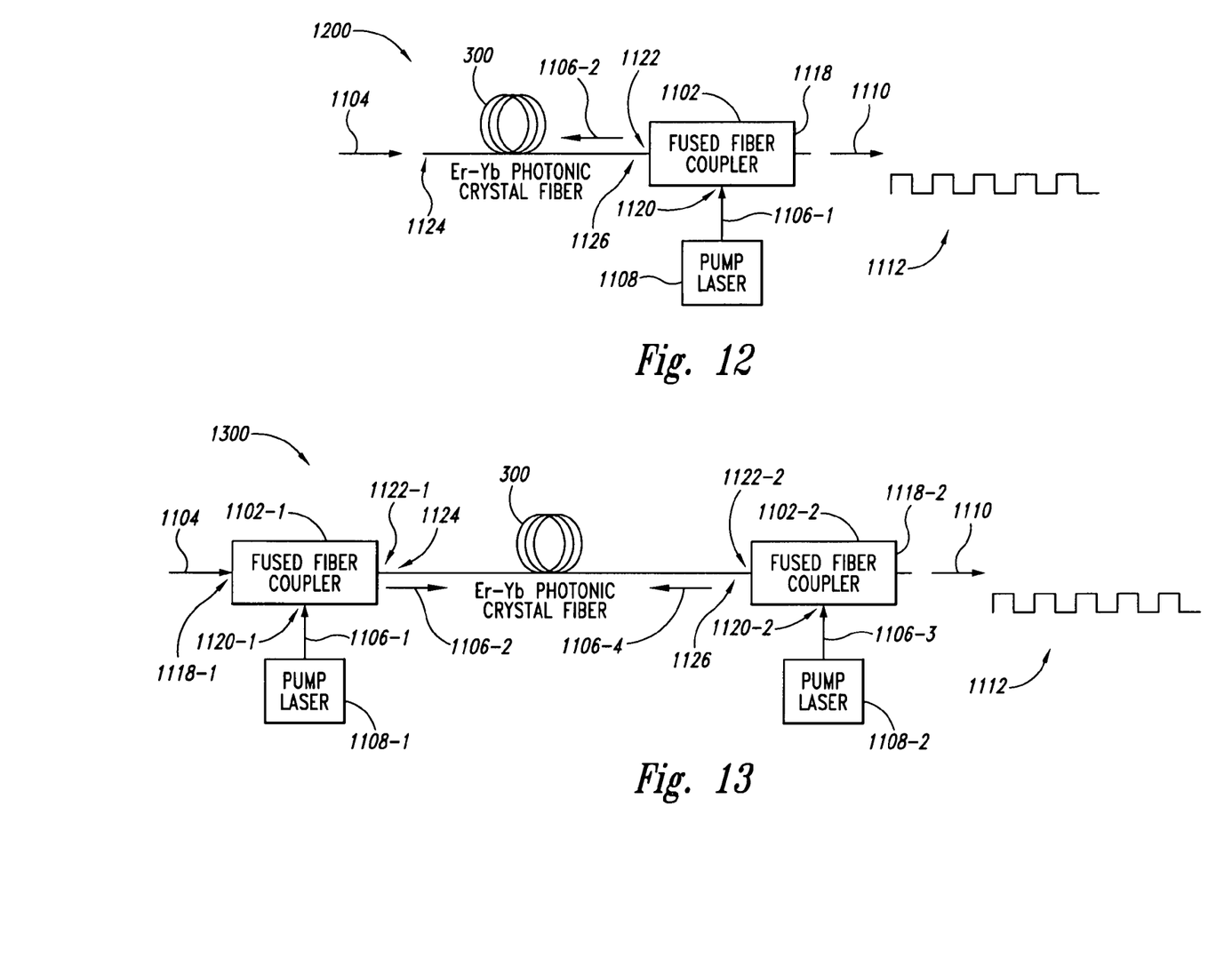
FIG. 12 shows a reverse pumped optical amplifier system using a photonic crystal fiber in accordance with an embodiment of the present invention.
FIG. 13 shows a combined forward and reverse pumped optical amplifier system using a photonic crystal fiber where each end of the photonic crystal fiber receives a pump light in accordance with an embodiment of the present invention.

FIG. 12 shows a reverse pumped optical amplifier system 1200 using a photonic crystal fiber 300 and having a similar function as system 1100 except that pump light 1106-2 travels in an opposite direction within fiber 300 compared with direction of travel for signal light 1104. In this embodiment, pump light 1106-1 is applied to coupler 1102 second port 1120, emitted as pump light 1106-2 from third port 1122, and applied to photonic crystal fiber 300 second end 1126 and travels in a direction from second end 1126 to first end 1124. Signal light 1104 is applied to photonic crystal fiber 300 first end 1124 and travels in a direction from first end 1124 to second end 1126. As described, pump light 1106-2 within fiber 300 causes excitation of the Yb atoms and promotes the process of stimulated emission from Er atoms within fiber 300 providing amplification of signal light 1104. The amplified signal light 1104 is emitted from coupler 1102 third port 1122 as output beam 1110.

FIG. 13 shows a combined forward and reverse pumped optical amplifier system 1300 using a photonic crystal fiber 300 where each end of fiber 300 receives a pump light. In this embodiment, pump light 1106-1 is applied to a first coupler 1102-1 second port 1120-1, emitted as pump light 1106-2 from third port 1122-1, and applied to fiber 300 first end 1124. Signal light beam 1104 is applied to first coupler 1102-1 first port 1118-1 and emitted along with pump light 1106-2 from first coupler 1102-1 third port 1122-1. Pump light 1106-3 is applied to second coupler 1102-2 second port 1120-2, emitted as pump light 1106-4 from third port 1122-2, and applied to fiber 300 second end 1126. In this manner, pump light 1106-2 and pump light 1106-4 are applied in opposite directions in order to cause excitation of the Yb atoms to promotes the process of stimulated emission from Er atoms within fiber 300 and provide amplification of signal light 1104. Amplified signal light is applied to second coupler 1102-2 third port 1122-2 and emerges from second coupler 1102-2 first port 1118-2 as an amplified output beam 1110.

Figure 14:
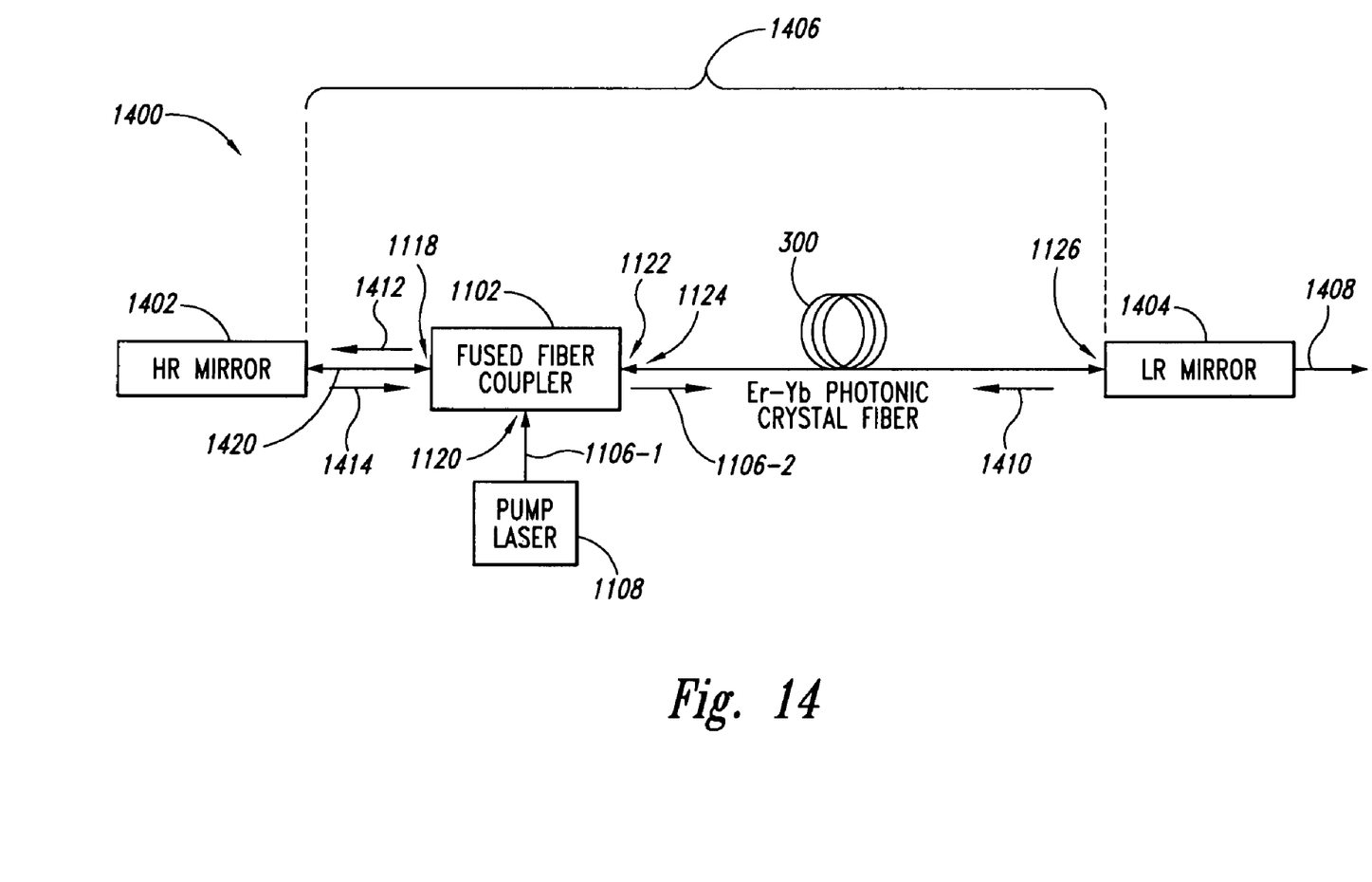
FIG. 14 shows a laser system using the photonic crystal fiber in accordance with an embodiment of the present invention.

FIG. 14 shows a laser system 1400 using a photonic crystal fiber 300. Laser system 1400 includes a high reflectivity (HR) mirror 1402, a fused fiber coupler 1102, a pump laser 1108, photonic crystal fiber 300, and a low reflectivity (LR) mirror 1404. A laser cavity 1406 is constructed by the components and light paths between HR mirror 1402 and LR mirror 1404. In this case, the pump light is the lasing light inside laser cavity 1406. In this case, mirrors at each end of the laser cavity provide feedback in the Er gain spectrum region. Pump light 1106-1 is applied to coupler 1102 second port 1120 and emitted as pump light 1106-2 from third port 1122 into fiber 300 first end 1124 and travels in a direction from first end 1124 to second end 1126.

Lasing light 1420 propagates through coupler 1102, is amplified by fiber 300, and is partially reflected by LR mirror 1404 as first reflected beam 1410 which then enters fiber 300 second end 1126 in a direction from second end 1126 to first end 1124. Reflected beam 1410 is amplified by traversing fiber 300 and enters coupler 1102 third port 1122. Amplified reflected beam 1410 is emitted from coupler 1102 first port 1118 as amplified beam 1412. Amplified beam 1412 is reflected by HR mirror 1402 as a reflected beam 1414 which then enters coupler 1102 first port 1118, completing one circulation pass through laser cavity 1406. When the power of the re-circulating light within laser cavity 1406 reaches a fiber laser lasing threshold, a laser light output beam 1408 in the Er gain spectrum is emitted. In this manner, laser cavity mirrors (1402, 1404) provide feedback for the signal light in Er gain spectrum and convert the pump power into lasing power. Driver electronics and power monitoring circuits are not shown.

The present disclosure teaches an apparatus, system, and method of using a high efficiency Er—Yb photonic crystal fiber configuration by significantly diluting the effective gain for Yb amplified spontaneous emission. Embodiments described above illustrate but do not limit the invention. It should also be understood that numerous modifications and variations are possible in accordance with the principles of the present invention. Accordingly, the scope of the invention is defined only by the following claims.

We claim:

1. A photonic crystal fiber, comprising:
a first cladding layer configured to propagate signal light, the first cladding layer including a plurality of photonic crystal rods disposed in an array along a longitudinal axis, the array having a separation between a first predetermined portion of the rods defining a core region, a second predetermined portion of the rods being doped with two predetermined rare earth elements and having a first refractive index, wherein the remaining photonic crystal rods have a second refractive index that is matched to the first refractive index by one of raising and lowering a doping material concentration in the remaining photonic crystal rods; and
a second cladding layer providing physical support for and surrounding the first cladding layer of the plurality of photonic crystal rods, the second cladding layer being configured to propagate pump light.

2. The photonic crystal fiber of claim 1, wherein the photonic crystal rods are configured to absorb pump light and amplify signal light.

3. The photonic crystal fiber of claim 1, wherein the photonic crystal rods have a hollow core surrounded by an outer perimeter that is one of round and hexagonal.

4. The photonic crystal fiber of claim 1, wherein the photonic crystal rods are disposed in at least three concentric rings having a geometrical arrangement around the core region.

5. The photonic crystal fiber of claim 4, wherein the geometrical arrangement is a hexagon.

6. The photonic crystal fiber of claim 4, wherein the predetermined portion of the photonic crystal rods being doped with two rare earth elements is the concentric ring closest to the core region.

7. The photonic crystal fiber of claim 6, wherein the second cladding layer does not include photonic crystal rods.

8. The photonic crystal fiber of claim 6, wherein the predetermined portion of the photonic crystal rods being doped with two rare earth elements is the entire plurality of the photonic crystal rods.

9. The photonic crystal fiber of claim 6, wherein the photonic crystal rods are doped with the elements erbium (Er) and ytterbium (Yb).

10. The photonic crystal fiber of claim 9, wherein the photonic crystal rods are doped with both erbium (Er) and ytterbium (Yb) in a predetermined ratio.

11. The photonic crystal fiber of claim 10, wherein the predetermined doping density ratio of ytterbium (Yb) to erbium (Er) is at least 8:1.

12. A photonic crystal fiber comprising:
a first cladding layer configured to propagate signal light, the first cladding layer including a plurality of photonic crystal rods disposed in an array along a longitudinal axis, the array having a separation between a first predetermined portion of the rods defining a core region and a second predetermined portion of the rods being doped with two predetermined rare earth elements;
an array background region surrounding and supporting the plurality of photonic crystal rods, the array background region having a second index of refraction;
a second cladding layer configured to propagate pump light, the second cladding layer providing physical support for and surrounding the first cladding layer of the plurality of photonic crystal rods; and
wherein the photonic crystal rods have a first index of refraction and the second cladding layer has a third index of refraction, the first index of refraction being higher than the second index of refraction, the first index of refraction being about equal to the third index of refraction.

13. The photonic crystal fiber of claim 12, further comprising:
a coating layer surrounding the second cladding layer, the coating layer having a fourth index of refraction that is lower than the third index.

14. The photonic crystal fiber of claim 13, wherein the coating layer is a protective polymer layer.

15. The photonic crystal fiber of claim 12, wherein the array background region includes a predetermined region of substantially pure silica.

16. The photonic crystal fiber of claim 12, wherein the photonic crystal rods are solid and have an outer perimeter that is one of round and hexagonal.

17. The photonic crystal fiber of claim 12, wherein the plurality of photonic crystal rods are arranged in a plurality of triangular lattices.

18. The photonic crystal fiber of claim 12, wherein the second cladding layer does not include photonic crystal rods.

19. An optical system, comprising:
- a photonic crystal fiber having a first end and a second end;
- a first light pump configured to provide a first pump light beam;
- a first optical coupler configured to couple the first pump light beam and a signal light beam into the photonic crystal fiber first end, the photonic crystal fiber second end emitting an amplified signal light beam as an output beam;
- wherein the photonic crystal fiber comprises:
- a first cladding layer configured to propagate signal light, the first cladding layer including a plurality of photonic crystal rods disposed in an array along a longitudinal axis, the array having a separation between a first predetermined portion of the crystal rods defining a core region, a second predetermined portion of the photonic crystal rods being doped with two predetermined rare earth elements and having a first refractive index, wherein the remaining photonic crystal rods have a second refractive index that is matched to the first refractive index by one of raising and lowering a doping material concentration in the remaining photonic crystal rods; and
- a second cladding layer providing physical support for and surrounding the first cladding layer, the second cladding layer being configured to confine pump light.

20. The system of claim 19, wherein the photonic crystal rods are disposed in at least three concentric rings having a geometrical arrangement around the core region.

21. The system of claim 20, wherein the predetermined portion of the photonic crystal rods being doped with at least one rare earth element (Er or Yb) is the concentric ring closest to the core region.

22. The system of claim 21, wherein the predetermined portion of the photonic crystal rods being doped with at least one rare earth element (Er or Yb) is the entire plurality of photonic crystal rods.

23. The system of claim 22, wherein the photonic crystal rods are doped with elements selected from the group comprising erbium (Er) and ytterbium (Yb).

24. The system of claim 23, wherein the photonic crystal rods are doped with both erbium (Er) and ytterbium (Yb) in a predetermined ratio.

25. The system of claim 24, wherein the predetermined doping density ratio of ytterbium (Yb) to erbium (Er) is at least 8:1.

26. The system of claim 19, wherein the first optical coupler receives the signal light beam in a first port, receives the first pump light beam in a second port, and emits the coupled light beam into the photonic crystal fiber out of a third port, the system further comprising:
- a low reflectivity mirror disposed adjacent to the photonic crystal fiber second end and configured to reflect light from the photonic crystal fiber second end; and
- a high reflectivity mirror disposed adjacent to the first optical coupler first port and configured to reflect light received by the first optical coupler from the photonic crystal fiber first end,
- wherein an optical path between the high reflectivity mirror and the low reflectivity mirror define a laser cavity.

27. The system of claim 19, further comprising:
- a second light pump configured to provide a second pump light beam;
- a second optical coupler configured to couple the second pump light beam into the photonic crystal fiber second end.

28. A method of using a photonic crystal fiber, the method comprising:
- coupling a signal light beam to a first end of the photonic crystal fiber and a pump light beam to one of the first end of the photonic crystal fiber and the second end of the photonic crystal fiber, the photonic crystal fiber having a core region, an inner cladding layer surrounding the core region and having a first plurality of photonic crystal rods doped with erbium (Er) and ytterbium (Yb) atoms and having a first refractive index and a second plurality of photonic crystal rods of a second refractive index that is matched to the first refractive index by one of raising and lowering a doping material concentration in the second plurality of photonic crystal rods, and an outer cladding layer surrounding the inner cladding layer;
- absorbing the combined light beam energy along the length of the photonic crystal fiber by a plurality of Yb atoms present within the photonic crystal fiber causing excitation of the Yb atoms;
- transferring the absorbed energy in the excited Yb atoms to Er atoms present within the photonic crystal fiber;
- confining an amplified spontaneous emission (ASE) falling within a gain bandwidth of Yb to the outer cladding layer; and
- confining the signal light and an Er ASE falling within a gain bandwidth of Er to the inner cladding region.

29. The method of claim 28, further comprising:
- amplifying the intensity of the signal light to produce an amplified signal output through a process of stimulated emission from a predetermined portion of the Er atoms disposed within the photonic crystal fiber, wherein the outer cladding layer and the core region do not include photonic crystal rods.

30. The method of claim 28, wherein the core region is doped with a predetermined ratio of erbium (Er) and ytterbium (Yb) atoms.

31. An optical system comprising:
- a photonic crystal fiber having a first end and a second end;
- a first light pump configured to provide a first pump light beam;
- a first optical coupler configured to couple the first pump light beam and a signal light beam into the photonic crystal fiber first end, the photonic crystal fiber second end emitting an amplified signal light beam as an output beam;
- wherein the photonic crystal fiber comprises:
- a first cladding layer configured to propagate signal light, the first cladding layer including a plurality of photonic crystal rods disposed in an array along a longitudinal axis and defining a core region, with the core region being doped with at least two rare earth elements and the photonic crystal rods being doped with at least one element;
- an array background region surrounding and supporting the plurality of photonic crystal rods, the array background region having a second index of refraction;
- a second cladding layer configured to confine pump light, the second cladding layer providing physical support for and surrounding the first cladding layer; and wherein the photonic crystal rods have a first index of refraction and the second cladding layer has a third index of refraction, the first index of refraction being higher than the second index of refraction and about equal to the third index of refraction.

32. The system of claim 31, further comprising:
a second light pump configured to provide a second pump light beam; and
a second optical coupler configured to couple the second pump light beam into the photonic crystal fiber second end.

33. The system of claim 31, wherein the photonic crystal rods are disposed in a geometrical arrangement around the core region, with the core region doped with erbium (Er) and ytterbium (Yb) atoms and the photonic crystal rods comprising Ge-doped silica.

34. The system of claim 31, wherein the core region and the second cladding layer do not include photonic crystal rods.

35. The system of claim 31, further comprising a coating layer surrounding the second cladding layer and having a fourth index of refraction which is less than the third index of refraction, and wherein the core region has a fifth index of refraction which is less than the first index of refraction.

36. The system of claim 31, wherein the first optical coupler receives the signal light beam in a first port, receives the first pump light beam in a second port, and emits the coupled light beam into the photonic crystal fiber out of a third port, the system further comprising:
a low reflectivity mirror disposed adjacent to the photonic crystal fiber second end and configured to reflect light from the photonic crystal fiber second end; and
a high reflectivity mirror disposed adjacent to the first optical coupler first port and configured to reflect light received by the first optical coupler from the photonic crystal fiber first end,
wherein an optical path between the high reflectivity mirror and the low reflectivity mirror define a laser cavity.

37. A method of using a photonic crystal fiber, the method comprising
coupling a signal light beam to a first end of the photonic crystal fiber and a pump light beam to one of the first end of the photonic crystal fiber and the second end of the photonic crystal fiber, the photonic crystal fiber having a core region doped with a predetermined ratio of erbium (Er) and ytterbium (Yb) atoms, an inner cladding layer surrounding the core region and including a first array of photonic crystal rods of a first refractive index and an array background region of a second refractive index surrounding and supporting the first array of photonic crystal rods, and an outer cladding layer of a third index of refraction surrounding the inner cladding layer, with the first index of refraction being higher than the second index of refraction and about equal to the third index of refraction;
absorbing the combined light beam energy along the length of the photonic crystal fiber by a plurality of the Yb atoms present within the photonic crystal fiber causing excitation of the Yb atoms;
transferring the absorbed energy in the excited Yb atoms to the Er atoms present within the photonic crystal fiber;
confining an amplified spontaneous emission (ASE) falling within a gain bandwidth of Yb to the outer cladding layer; and
confining the signal light and an Er ASE falling within a gain bandwidth of Er to the inner cladding region.

38. The method of claim 37, further comprising:
amplifying the intensity of the signal light to produce an amplified signal output through a process of stimulated emission from a predetermined portion of the Er atoms disposed within the photonic crystal fiber.

39. The method of claim 37, further comprising surrounding the outer cladding layer with a coating layer having a fourth refractive index which is less than the third refractive index of the outer cladding layer, and wherein the core region has a fifth refractive index which is less than the first refractive index.

40. The method of claim 37, wherein the outer cladding layer and the core region do not include photonic crystal rods.

41. A photonic crystal fiber comprising
a first cladding layer configured to propagate signal light, the first cladding layer including a plurality of photonic crystal rods disposed in an array along a longitudinal axis and defining a core region, with the core region being doped with at least two rare earth elements and the photonic crystal rods being doped with at least one element;
an array background region surrounding and supporting the plurality of photonic crystal rods, the array background region having a second index of refraction;
a second cladding layer configured to propagate pump light, the second cladding layer providing physical support for and surrounding the first cladding layer of the plurality of photonic crystal rods; and
wherein the photonic crystal rods have a first index of refraction and the second cladding layer has a third index of refraction, the first index of refraction being higher than the second index of refraction and approximately equal to the third index of refraction.

42. The photonic crystal fiber of claim 41, further comprising a coating layer surrounding the second cladding layer, the coating layer having a fourth index of refraction that is lower than the third index of refraction, and wherein the core region has a fifth index of refraction which is less than the first index of refraction.

43. The photonic crystal fiber of claim 42, wherein the coating layer is a protective polymer layer.

44. The photonic crystal fiber of claim 41, wherein the photonic crystal rods are disposed in a geometrical arrangement around the core region, with the core region doped with erbium (Er) and ytterbium (Yb) atoms and the photonic crystal rods comprising Ge-doped silica.

45. The photonic crystal fiber of claim 41, wherein the core region and the second cladding layer do not include photonic crystal rods.

46. The photonic crystal fiber of claim 41, wherein the plurality of photonic crystal rods are arranged in a plurality of triangular lattices.

* * * * *